US005347707A

United States Patent [19]

Beach

[11] Patent Number: 5,347,707

[45] Date of Patent: Sep. 20, 1994

[54] ROOFING WASHER-DISPENSING AND FASTENER-DRIVING MACHINE

[75] Inventor: John R. Beach, Elmhurst, Ill.

[73] Assignee: Illinois Tool Works Inc., Glenview, Ill.

[21] Appl. No.: 51,056

[22] Filed: Apr. 21, 1993

[51] Int. Cl.[5] .............................. B23Q 7/10

[52] U.S. Cl. .............................. 29/809; 29/787; 29/798; 81/433

[58] Field of Search .............................. 29/281.1, 432, 787, 29/798, 809, 811.2, 813; 81/433, 434, 435

[56] References Cited

U.S. PATENT DOCUMENTS

| | | | |
|---|---|---|---|
| 4,246,939 | 1/1981 | Boegel | 29/813 X |
| 4,817,275 | 4/1989 | Van Berkel | 29/787 |
| 4,890,968 | 1/1990 | Beach et al. | 411/531 |
| 5,042,142 | 8/1991 | Beach et al. | 29/787 |
| 5,056,684 | 10/1991 | Beach et al. | 221/197 |
| 5,058,464 | 10/1991 | McGovern et al. | 81/433 X |

*Primary Examiner*—Mark Rosenbaum
*Assistant Examiner*—S. Thomas Hughes
*Attorney, Agent, or Firm*—Dressler, Goldsmith, Shore & Milnamow, Ltd.

[57] ABSTRACT

In a machine for dispensing stackable roofing washers individually and for driving fasteners through such washers, a shuttle is actuatable to displace a lowermost washer of one from a stack, either a small, circular or large, square washer. A gate is biased toward a lowermost position wherein it provides sufficient clearance for the lowermost washer but not any overlying washer to pass beneath it. A pawl mounted pivotally to the gate is biased to a lowermost position wherein the pawl engages a small washer displaced by the shuttle so as to restrain it against backward movement. A stop is adjustable so as to limit movement of a washer of whichever size is being displaced. A measuring bar is mounted via the stop. A screw gun, which provides a primary handle, and a secondary handle are mounted to an upright element so as to be independently adjustable.

6 Claims, 11 Drawing Sheets

Fig. 2
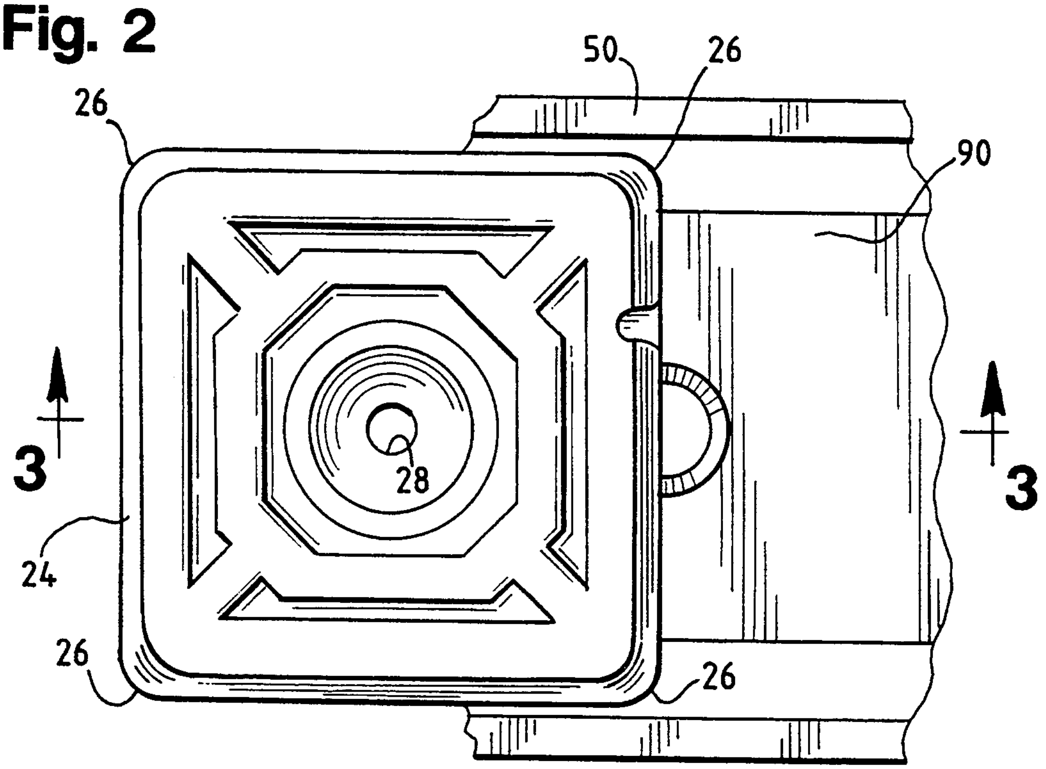
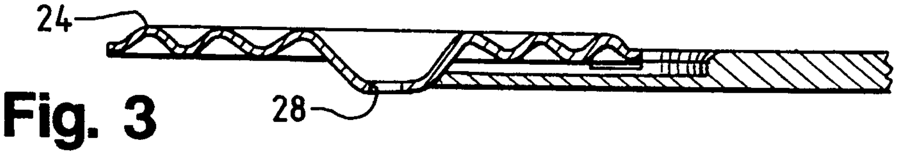
Fig. 3
Fig. 4
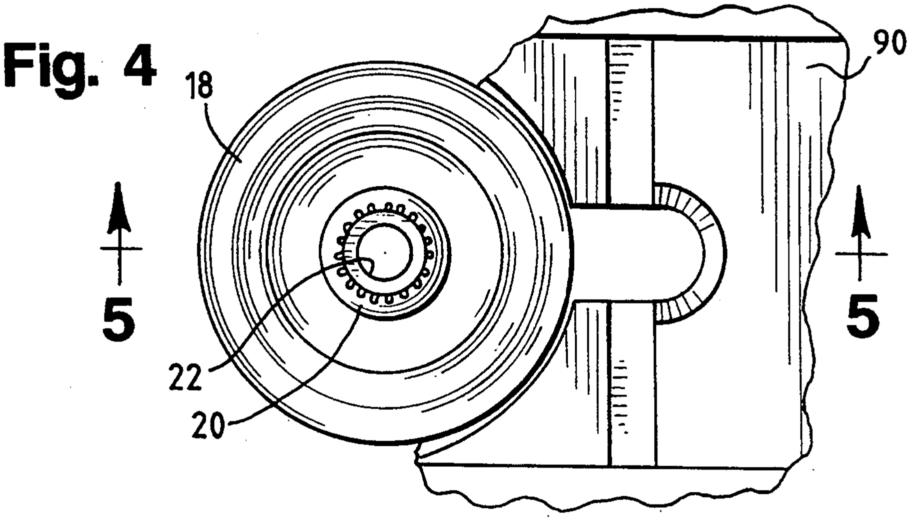
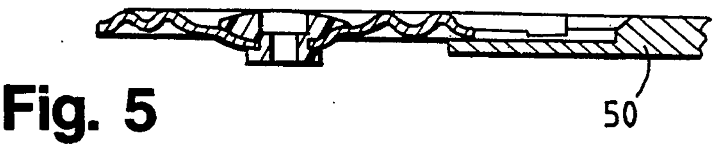
Fig. 5

Fig. 7
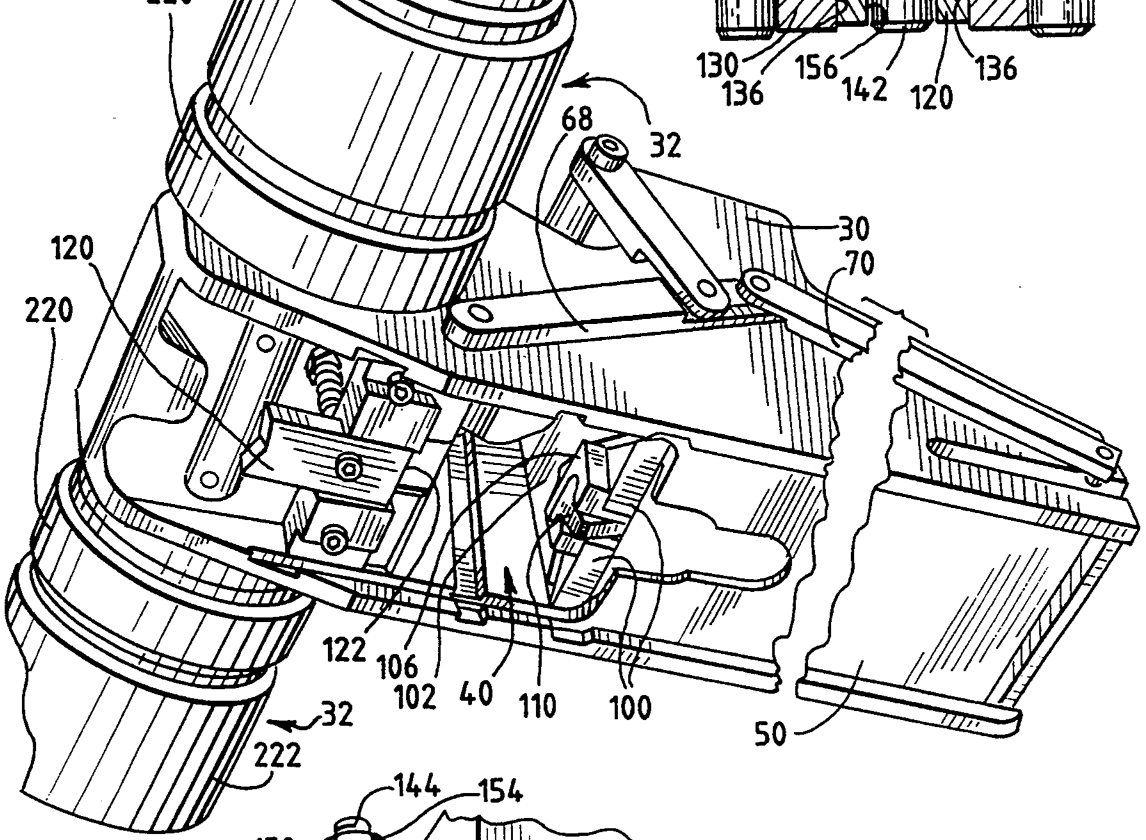
Fig. 10
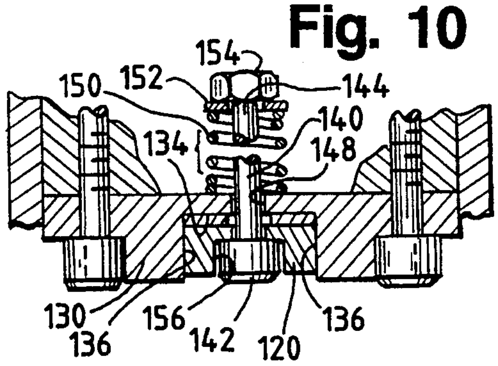
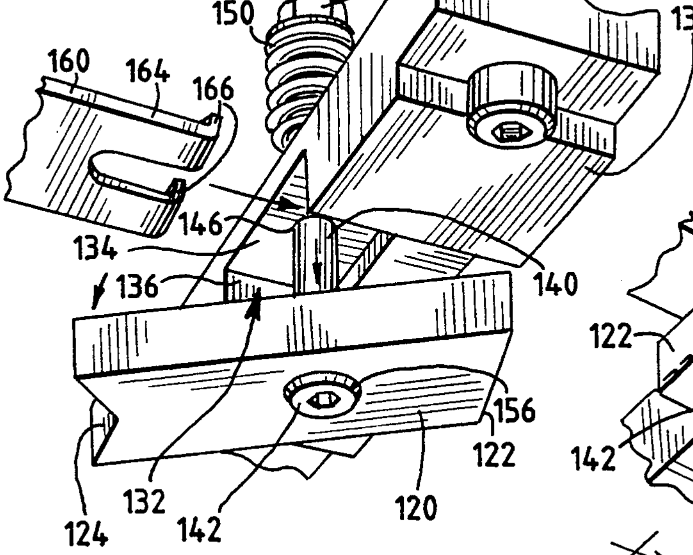
Fig. 8
Fig. 9
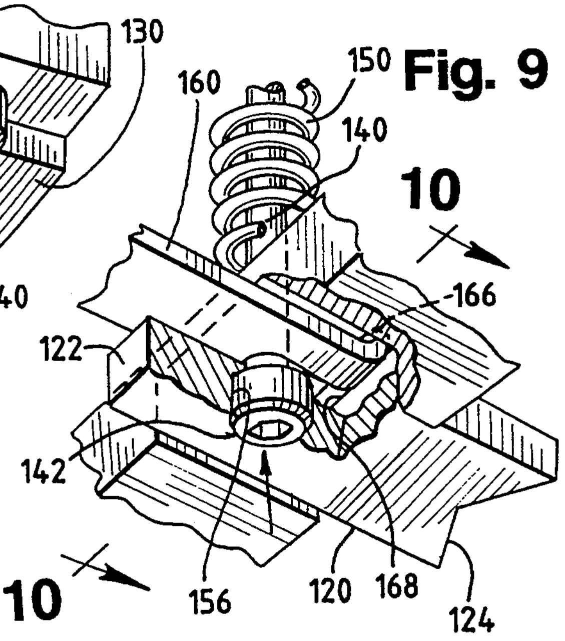

Fig. 20
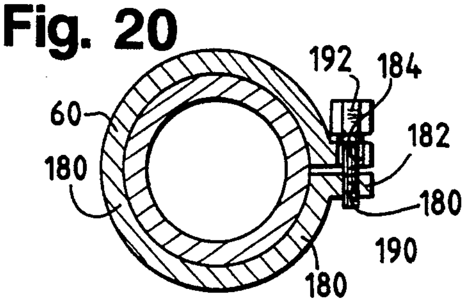
Fig. 19
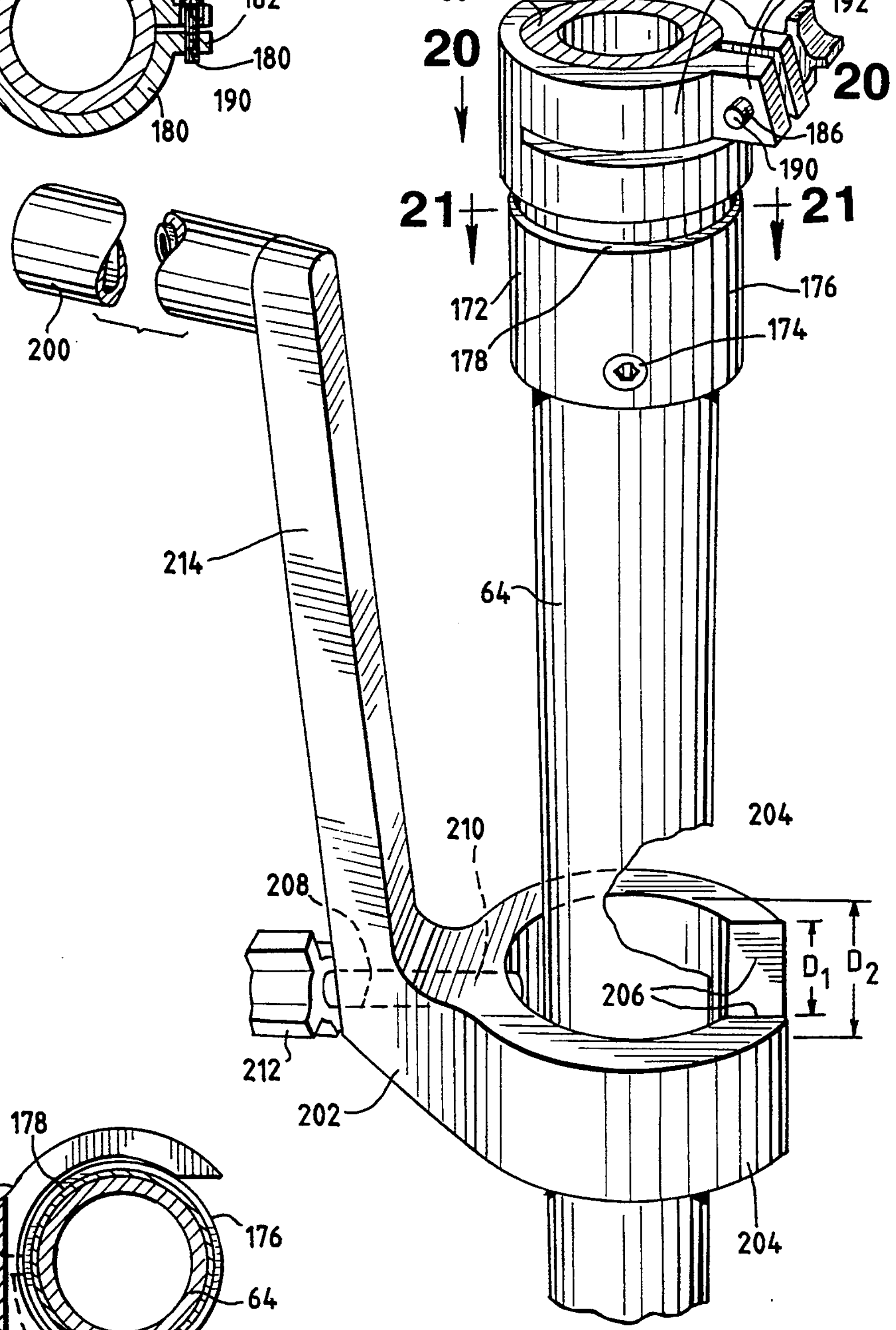
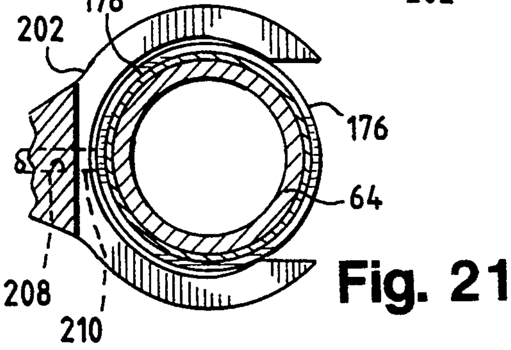
Fig. 21

Fig. 22
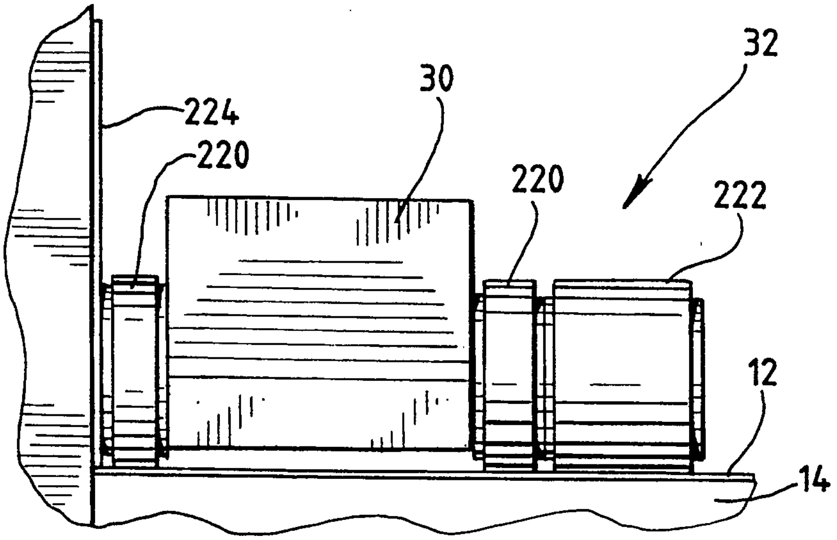
Fig. 23
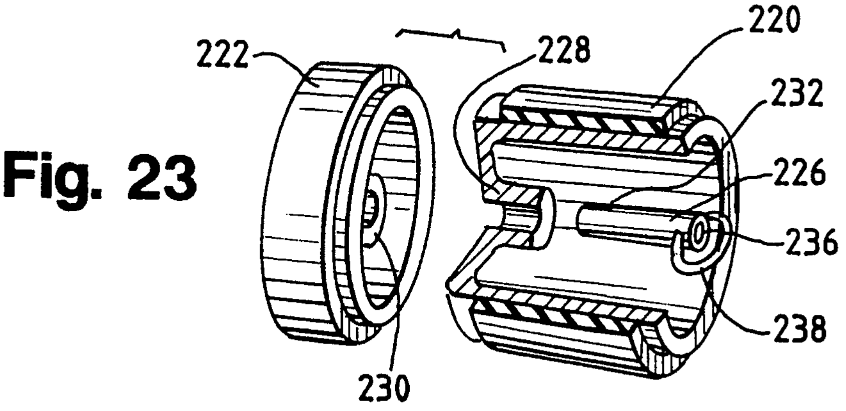
Fig. 24
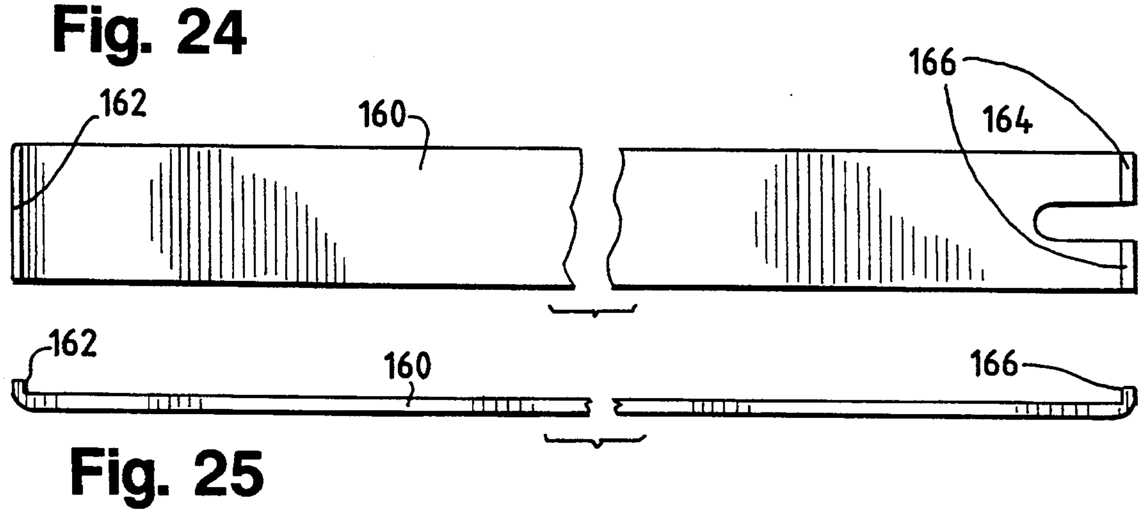
Fig. 25

ROOFING WASHER-DISPENSING AND FASTENER-DRIVING MACHINE

TECHNICAL FIELD OF THE INVENTION

This invention pertains to improvements in a machine for dispensing stackable roofing washers individually from a stack of such washers and for driving fasteners through such washers. Such a machine is useful for fastening one or more layers of roofing material to an underlayment.

BACKGROUND OF THE INVENTION

A machine for dispensing stackable roofing washers individually from a stack of such washers and for driving fasteners through such washers is exemplified in Beach et al. U.S. Pat. Nos. 4,890,968, 5,042,142, and 5,056,684. Such a machine is useful for fastening one or more layers of roofing material, such as a roofing membrane or one or more layers of roofing insulation, to an underlayment.

As exemplified in the patents noted above, the washer-dispensing features of the machine comprise a base, a shuttle mounted movably to the base, and a mechanism for moving the shuttle. The shuttle is movable to a washer-releasing position relative to the base and to a washer-engaging position relative thereto and is biased to the washer-releasing position. The shuttle is adapted to remove a lowermost washer from the stack and to cause movement of the lowermost washer to a discharge position by positive engagement of the shuttle with the lowermost washer when moved from the washer-engaging position to the washer-releasing position. The shuttle-moving mechanism, which is actuatable by a user, moves the shuttle from the washer-releasing position to the washer-engaging position when actuated. Such mechanism, which is deactuated normally, permits the shuttle to return to the washer-releasing position when deactuated. Such washer-dispensing and fastener-driving machines are available commercially from ITW Buildex (a division of Illinois Tool Works Inc.) of Itasca, Ill., under its ACCUTRAC trademark.

Stackable roofing washers useful in such washer-dispensing and fastener-driving machines are available commercially from ITW Buildex, supra, in plural sizes having different features and including relatively large, generally square, stamped steel washers and relatively small, generally circular, stamped steel washers with plastic inserts. As used commonly over a layer of roofing insulation, such relatively large, generally square, stamped steel washers are exemplified in Beach et al. U.S. Pat. Nos. 4,890,968 and 5,042,142. As used commonly over roofing membranes, such relatively small, generally circular, stamped steel washers with plastic inserts are exemplified in Beach et al. U.S. Pat. No. 5,056,684.

It would be highly desirable to have a single machine that could be selectively adapted to dispense washers of either size. However, efforts to develop such a selectively adaptable machine having a shuttle that could be alternatively used with washers of either size have been unsuccessful heretofore, primarily because it has been found that such relatively small washers have an undesirable tendency to move with the shuttle when the shuttle is moved from the washer-releasing position. Such tendency is due to friction.

SUMMARY OF THE INVENTION

According to a primary aspect of this invention, a novel combination of washer-handling elements is provided in a washer-dispensing machine. The machine may be a washer-dispensing and fastener-driving machine, as described above. Broadly, the novel combination comprises a base, a shuttle, and a shuttle-moving mechanism, along with a novel mechanism for restraining the washer overlying the lowermost washer against being removed with the lowermost washer when the shuttle next is moved from the washer-releasing position.

The washer-restraining mechanism includes a gate, which is movable vertically toward and away from a lower position, and which is biased toward the lower position. In the lower position, the gate provides sufficient clearance for the lowermost washer from the stack to pass beneath the gate but insufficient clearance for any overlying washer to pass beneath the gate.

As a significant improvement provided by this invention, the washer-restraining mechanism further includes a pawl, which is mounted pivotally to the gate so as to be pivotally movable through a range of positions including upper, inoperative positions and a lower, operative position. In the inoperative positions, the pawl provides sufficient clearance for the lowermost washer being removed from the stack to pass beneath the pawl to the discharge position. In the operative position, the pawl is disposed to prevent a washer in the discharge position from moving with the shuttle when the shuttle next moves from the washer-releasing position, by engaging a trailing edge of the displaced washer if the washer therein has a sufficiently small size to permit the pawl to pivot to the operative position when the shuttle next moves from the washer-releasing position. The pawl is biased to the operative position, preferably by a spring acting between the pawl and the gate. The gate constitutes means for preventing a washer displaced from the stack to the separated position from moving with the shuttle when the shuttle next moves from the washer-releasing position if the washer has a larger size preventing the pawl from pivoting to the operative position.

Preferably, the machine is adaptable for dispensing relatively large washers, such as the generally square washers noted above, or relatively small washers, such as the generally circular washers noted above. The shuttle may be thus adapted to dispense a lowermost washer of either size from a stack of similar washers. In the operative position, the pawl is disposed to limit movement of such a relatively small washer displaced by the shuttle to the washer-engaging position. Also, the shuttle may have a recess, which is shaped to accommodate the pawl in the operative position.

Preferably, the base has a lower outlet, which is adapted to discharge an individual roofing washer of either size. A stop may be then mounted to the base so as to be selectively adjustable between a position wherein the stop is arranged to permit movement of such a relatively large washer to the washer-releasing position and a position wherein the stop is arranged to limit movement of such a relatively small washer to the washer-releasing position by engaging the leading edge thereof. In the latter position, the stop is arranged to center the washer having the leading edge engaged by the stop in longitudinal relation to the lower outlet.

Preferably, the base has a channel extending longitudinally and having two opposite sides. The channel opens downwardly and is adapted to accommodate the stop. A bolt is mounted to the base. The stop is mounted to the bolt so as to be vertically movable between an elevated position wherein the stop is accommodated by the channel and a lowered position wherein the stop is disposed below the channel and so as to be rotatably adjustable to the positions noted above when moved to the lowered position. The stop is biased to the elevated position. The stop is confined by the channel sides so as to be non-rotatable when moved to the elevated position.

Preferably, moreover, a measuring bar is provided, which has a bifurcated end defining two parallel legs. The parallel legs are adapted to fit within the opposite sides of the channel, between the stop and the base, so that the measuring bar extends longitudinally from the base. The parallel legs may be upwardly bent to define two hooks, whereupon the base may have a transverse recess. The transverse recess, which opens downwardly, is adapted to accommodate the hooks.

According to a further aspect of this invention, a novel combination comprising two separate handles is provided in a fastener-driving machine. The machine may be a washer-dispensing and fastener-driving machine, as described above. Broadly, the novel combination comprises an elongate, upright element, a screw gun mounted to an upper end of such element and having a handle constituting a primary handle, and a secondary handle mounted to such element. The primary handle extends in a generally perpendicular direction relative to the elongate, upright element, at a level near the upper end of such element. The secondary handle is mounted so as to extend in a generally perpendicular direction relative to the elongate, upright element, at a level approximating the level of the primary handle, and so as to define an angle within a range from an acute angle to a straight angle between the primary and secondary handles.

Preferably, the screw gun and the secondary handle are mounted adjustably to the elongate, upright element in such manner that the angle between the primary and secondary handles is adjustable within the range noted in the preceding paragraph. Preferably, moreover, the screw gun and the secondary handle are mounted thereto so as to be independently adjustable.

According to a further aspect of this invention, a novel combination is provided in a washer-dispensing and fastener-drawing machine, which may be as described above. Broadly, the novel combination comprises a base, means including a shuttle mounted movable to the base for displacing a lowermost washer from a stack and for moving the lowermost washer to a separated position, means including a screw gun for driving a fastener rotatably and downwardly through the displaced washer in the separated position, and means including an element engageable with the displaced washer for preventing the displaced washer from rotating when a fastener is being driven through the displaced washer by the screw gun.

The novel combination noted in the preceding paragraph is useful particularly but not exclusively if the machine is adaptable for dispensing stackable roofing washers in either of two types, namely generally square washers and generally oblong washers, each having two relatively long sides and two relatively short ends.

Preferably, the element engageable with the displaced washer is adjustable upwardly to an inoperative position and downwardly to an operative position. In the inoperative position, that element is not engageable with a washer of either type in the separated position. In the operative position, that element is engageable with one of the relatively long sides of such a generally oblong washer in the separated position.

Preferably, moreover, the element engageable with the displaced washer includes a rod having a lower, straight portion and an upper, hooked portion. Thus, the lower, straight portion is mounted to the base so as to be upwardly and downwardly movable and is biased downwardly toward the operative position. Also, the upper, hooked portion is manipulatable in the inoperative position so as to hook over a portion of the base.

These and other objects, features, and advantages of this invention are evident from the following description of a preferred embodiment of this invention with reference to the accompanying drawings.

BRIEF DESCRIPTION OF THE DRAWINGS

FIG. 1 also shows, fragmentarily, an underlayment, a sheet of roofing material covering the underlayment, and two roofing washers disposed on the sheet of roofing material. Two screws are shown, one as having been driven through one roofing washer, through the sheet of roofing material, into the underlayment, and another about to enter a screw-feeding tube of the machine.

FIG. 2, on a larger scale, is a top plan view of a representative, relatively large, generally square washer, which the machine is capable of dispensing. FIG. 2 also shows a shuttle of the machine, fragmentarily.

FIG. 3 is a sectional view taken along line 3—3 of FIG. 2, in a direction indicated by arrows.

FIG. 4, on a similar scale, is a top plan view of a representative, relatively small, generally circular washer, which the machine is capable of dispensing. FIG. 4 also shows the shuttle, fragmentarily.

FIG. 5 is a sectional view taken along line 5—5 of FIG. 4, in a direction indicated by arrows.

FIG. 7 is a fragmentary, perspective view of washer-dispensing components of the machine, as seen from a lower vantage. The measuring scale again is omitted.

FIG. 8 is an enlarged, exploded, fragmentary detail taken from FIG. 7, showing the measuring scale being attached to the machine, and showing an adjustable stop being adjusted to accommodate the generally square washers.

FIG. 9 is a view similar to FIG. 8, showing the measuring scale attached to the machine, and showing the adjustable stop adjusted to accommodate the generally circular washers.

FIG. 10 is a sectional view taken along line 10—10 of FIG. 9, in a direction indicated by arrows.

FIG. 19 is an enlarged, fragmentary, perspective view showing an adjustable clamp for mounting a screw gun to a tubular element of the machine and showing an auxiliary handle mounted adjustably to the tubular element. A driving bit and other elements within the tubular element are omitted to simplify the view.

FIG. 20 is a sectional view taken along line 20—20 of FIG. 17, in a direction indicated by arrows. The driving bit and other elements within the tubular element again are omitted.

FIG. 21 is a sectional view taken along line 21—21 of FIG. 18, in a direction indicated by arrows. The driving bit and other elements within the tubular element again are omitted.

FIG. 22 is an elevational detail showing one of two rollers with an outer part removed so as to permit the machine to be positioned near a wall.

FIG. 23 is a fragmentary, exploded detail of one of the rollers, which includes a removable pin for assembling the outer and inner parts thereof.

FIG. 24 is a fragmentary, plan view of the measuring scale.

FIG. 25 is a fragmentary, edge view of the measuring scale.

DETAILED DESCRIPTION OF PREFERRED EMBODIMENT

Figure 1:
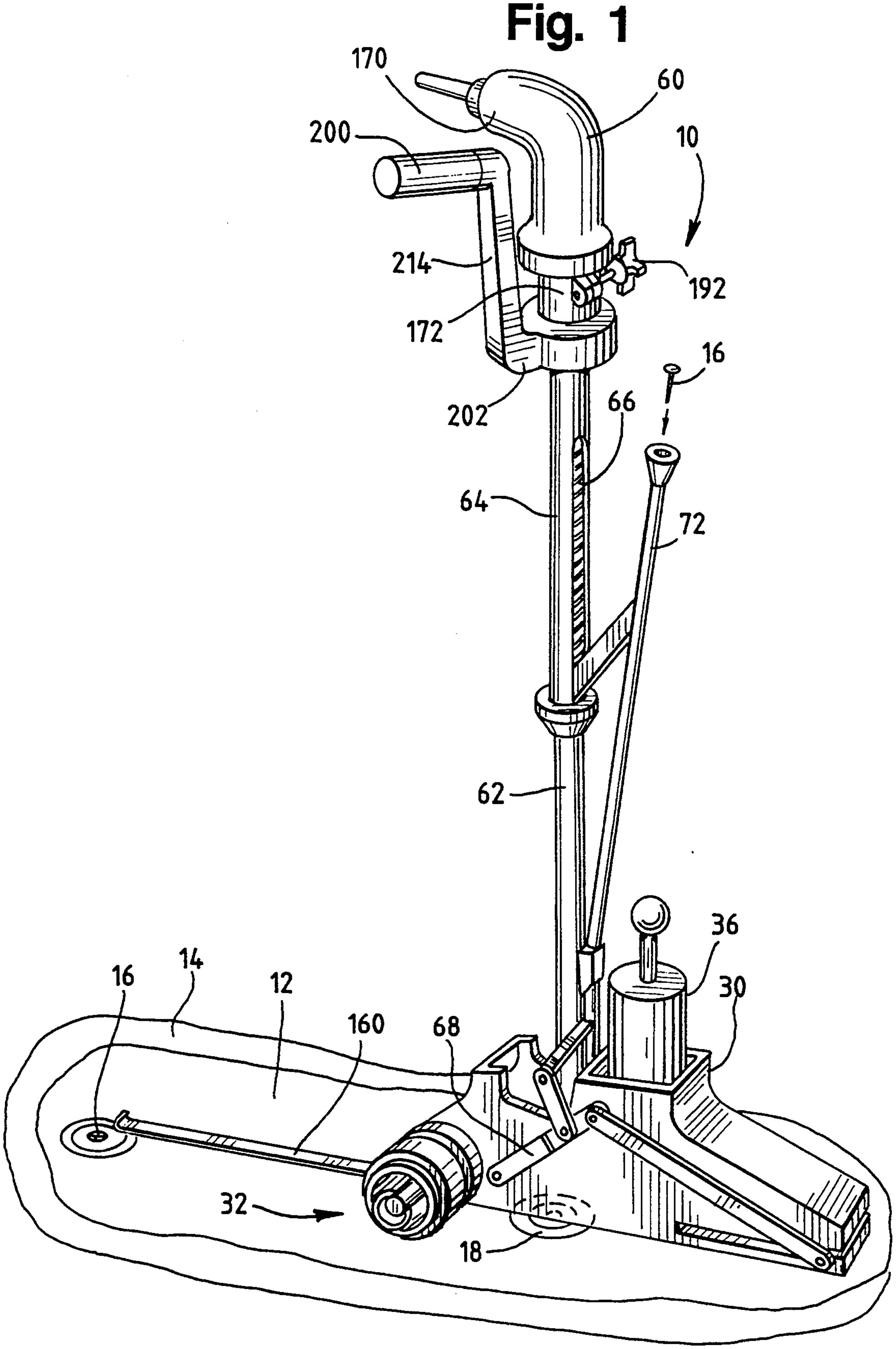
FIG. 1 is a perspective view of a washer-dispensing and fastener-driving machine according to this invention.

As shown in FIG. 1, this invention may be advantageously embodied in a washer-dispensing and fastener-driving machine 10, which constitutes a preferred embodiment of this invention. The machine 10 is useful for fastening a sheet 12 of roofing material to an underlayment 14, by means of screws 16 of a known type having heads and integral washers, with a roofing washer interposed between the head and integral washer of each screw 16 and the sheet 12. Suitable screws are available commercially from ITW Buildex, supra, under its HEXCEL trademark.

The machine 10 is adaptable for stackable roofing washers of either of two sizes. As shown in FIGS. 1, 4, and 5 and in other views, each roofing washer may be a relatively small, generally circular, stamped steel washer 18 having a plastic insert 20 and having a central aperture 22. Such washers 18 have particular utility where the sheet 12 of roofing material is a roofing membrane. As shown in FIGS. 2 and 3 and in other views, each roofing washer may be a relatively large, generally square, stamped steel washer 24 having rounded corners 26 and a central aperture 28. Such washers 24 have particular utility where the sheet 12 of roofing material is a blanket of roofing insulation. Suitable washers of both sizes are available commercially from ITW Buildex, supra.

Except as illustrated in the drawings and described herein, the machine 10 is similar in its construction and operation to washer-dispensing and fastener-driving machines disclosed in Beach et al. U.S. Pat. Nos. 4,890,968, 5,042,142, and 5,056,684, the disclosures of which three patents are incorporated herein by reference. Such a machine, as adapted for relatively large generally square, stamped steel washers like the washers 18, is disclosed in Beach et al. U.S. Pat. Nos. 4,890,968 and 5,042,142. Such a machine, as adapted for relatively small generally circular stamped steel washers like the washers 24, is disclosed in Beach et al. U.S. Pat. No. 5,056,684. Whichever size is used, the machine 10 dispenses the washers individually onto the sheet 12, at spaced locations, and drives a screw 16 through the central aperture of each washer, through the sheet 12, and into the underlayment 14, until the head and integral washer of the screw 16 bear against such washer.

Figure 6:
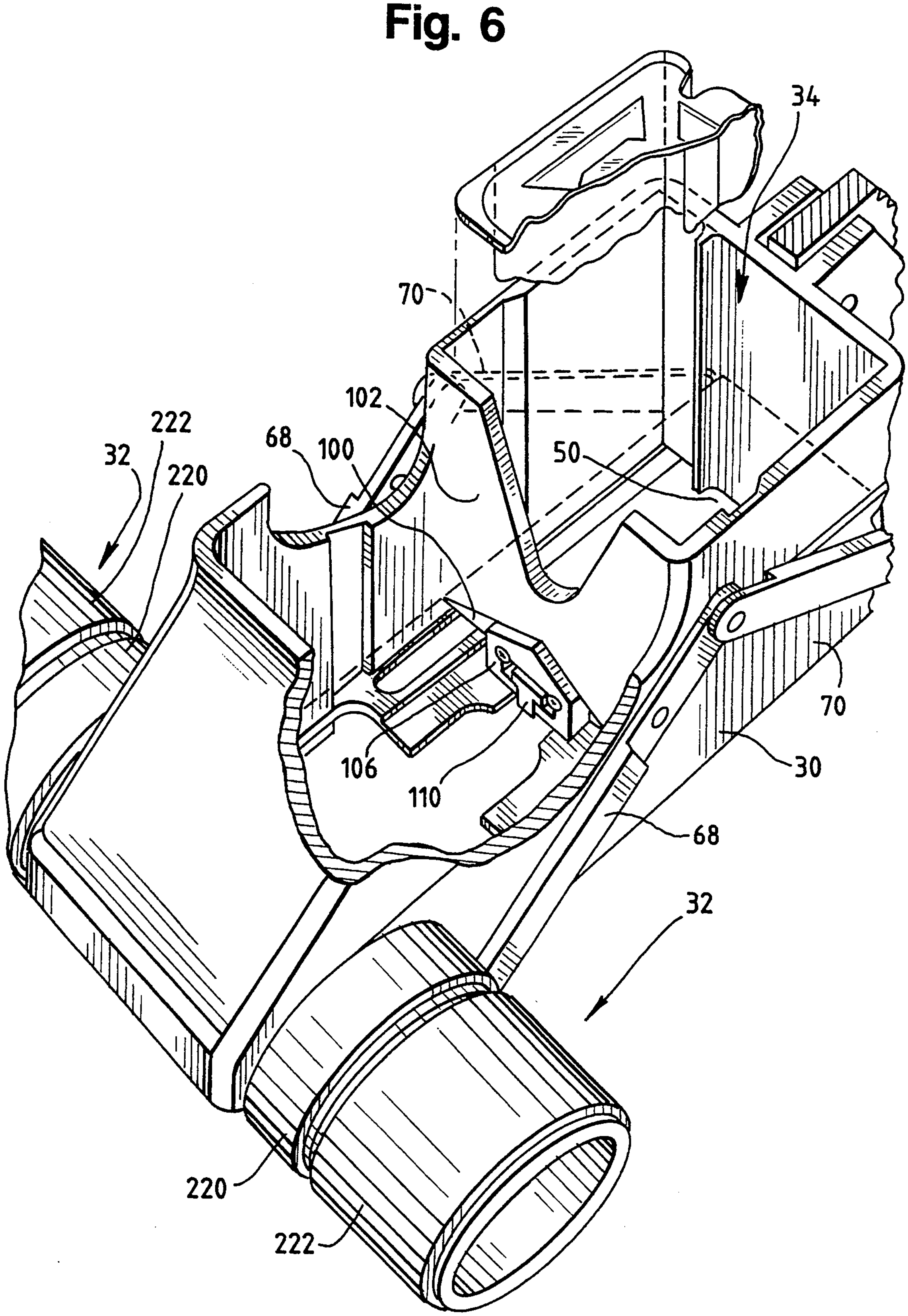
FIG. 6 is a fragmentary, perspective view of washer-dispensing components of the machine, as seen from an upper vantage. A measuring scale shown in FIG. 1 is omitted.
Figure 11:
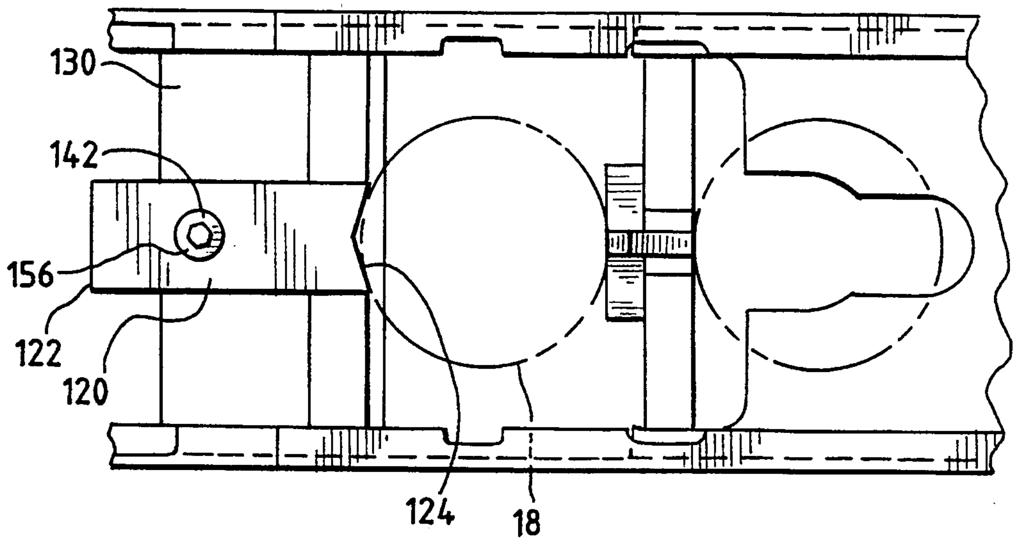
FIG. 11, on a smaller scale compared to the scale of FIGS. 8, 9, and 10, is a bottom plan view of the adjustable stop and related components of the machine, as adjusted to accommodate the generally square washers.
Figure 12:
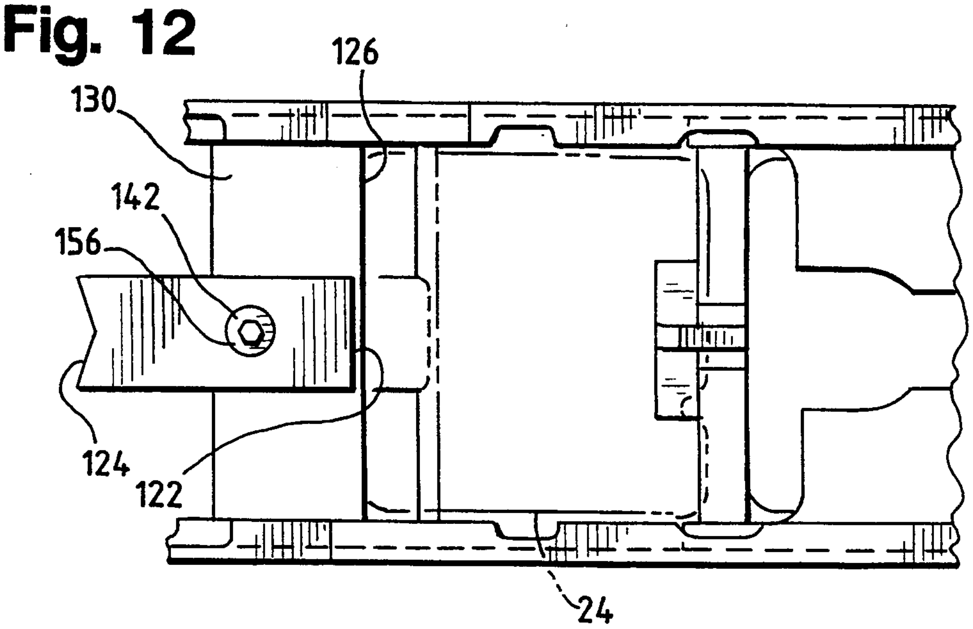
FIG. 12 is a similar view of the adjustable stop and related components of the machine, as adjusted to accommodate the generally circular washers.

As shown in FIGS. 1, 6, and 7, the machine 10 comprises a base 30, rollers 32 mounted to the base so as to enable the machine 10 to be manually moved, and a chute 34 defined by the base 30. As shown in FIG. 1, if the relatively small, generally circular washers 18 are used, a magazine 36 containing a stack of such washers 18 is inserted removably into the chute 34. The magazine 36 is similar to the magazine disclosed in Beach et al. U.S. Pat. No. 5,056,684. As shown in FIG. 6, if the relatively large, generally square washers 24 are used, the washers 24 are stacked in the chute 34, possibly in a thin-walled container (not shown) similar to the container disclosed in Beach et al. U.S. Pat. No. 5,042,142. As shown in FIG. 7, the base 30 defines a lower outlet 40, through which the washers 18 or the washers 24 can be individually dispensed.

Moreover, the machine 10 comprises a shuttle 50 mounted movably to the base 30 so as to be backwardly movable to a washer-releasing position relative to the base 30, and so as to be forwardly movable to a washer-engaging position relative thereto, a mechanism for biasing the shuttle 50 to the washer-releasing position, a mechanism actuatable by a user and deactuated normally for moving the shuttle 50 from the washer-releasing position to the washer-engaging position, and a mechanism for driving a fastener, such as a screw 16 through the central aperture of a washer, such as one of the washers 18 or one of the washers 24, while the washer is at the washer-releasing position and the shuttle 50 is at the washer-engaging position.

As disclosed in the Beach et al. patents noted above, the shuttle-biasing, shuttle-moving, and fastener-driving mechanisms are provided by linking a screw gun 60 to the shuttle 50. As disclosed therein, the machine 10 includes a lower, tubular element 62, an upper, tubular element 64 mounting the screw gun 60 and telescoped over the tubular element 62, a coiled spring 66 arranged to bias the tubular element 64 upwardly within a limited range of vertical movement of the tubular element 64 relative to the tubular element 62, along with various interconnected links, which include rear toggle links 68 connected pivotally to the base 30 and front toggle links 70 connected pivotally to the links 68 and to the shuttle 50. As disclosed therein, a screw-feeding tube 72 is connected operatively to the toggle links 68, 70, and is mounted to the tubular element 64 so as to be conjointly movable with the tubular element 64 and the screw gun 60 relative to the tubular element 62.

As disclosed in the Beach et al. patents noted above, the screw gun 60 is linked to the shuttle 50 in such manner that the shuttle 50 is biased to the washer-releasing position by the coiled spring 66 biasing the tubular element 64, that the shuttle 50 is moved from the washer-releasing position to the washer-engaging position and a driving bit (not shown) extending operatively from the screw gun 60 through the tubular elements 62, 64, is moved to a position where the driving bit can drive a screw 16 fed through the screw-feeding tube 72 when the screw gun 60 is pushed downwardly with sufficient force to compress the coiled spring 66, and that the shuttle 50 is moved to the washer-releasing position by the coiled spring 66 when the screw gun 60, the tubular element 64, and the screw-feeding tube 72 are permitted to move upwardly along the tubular element 62.

As shown in FIGS. 2 through 5 and in other views, the shuttle 50 is configured to coact either with a relatively small, generally circular washer 18 or with a relatively large, generally square washer 24. As suggested by FIG. 17, a front portion 80 of the shuttle 50 has sufficient thickness to retain a stack of such washers 18 in the magazine 36 or a stack of such washers 24 in the chute 34 when the shuttle 50 is moved to the washer-releasing position. The lowermost washer 18 in the magazine 36 rests on an upper surface 82 of the front portion 80 when the shuttle 50 is moved thereto.

A back portion 90 of the shuttle 50 has a generally U-shaped recess 92 opening upwardly and backwardly, having a generally U-shaped wall 94, and conforming generally to one of the relatively small, generally circular washers 18. Thus, as suggested by FIGS. 4 and 5 and in FIGS. 16, 17, and 18, the shuttle 50 is adapted to remove the lowermost washer 18 from a stack of the generally circular washers 18 in the magazine 36, to receive the removed washer 18 in the recess 92, and to move the lowermost washer 18 therefrom to a washer-releasing position above the lower outlet 40 defined by the base 30, by positive engagement of the wall 94 with the washer 18 being moved, when the shuttle 50 is moved from the washer-engaging position to the washer-releasing position.

The back portion 90 of the shuttle 50 has an intermediate platform 96 defining the front and lateral margins of the recess 92 and spaced from the front portion 80 by a groove 98 extending transversely. Thus, as suggested in FIGS. 2 and 3 and in FIGS. 14 and 15, the shuttle 50 is adapted to remove the lowermost washer 24 from a stack of the generally square washers 24 in the magazine 36, to receive the removed washer 24 on the platform 96, and to move the lowermost washer 24 therefrom to a washer-releasing position above the lower outlet 40 defined by the base 30, by positive engagement of the front portion 80 (at the groove 98) with the washer 24 being moved, when the shuttle 50 is moved from the washer-engaging position to the washer-releasing position.

Figure 13:
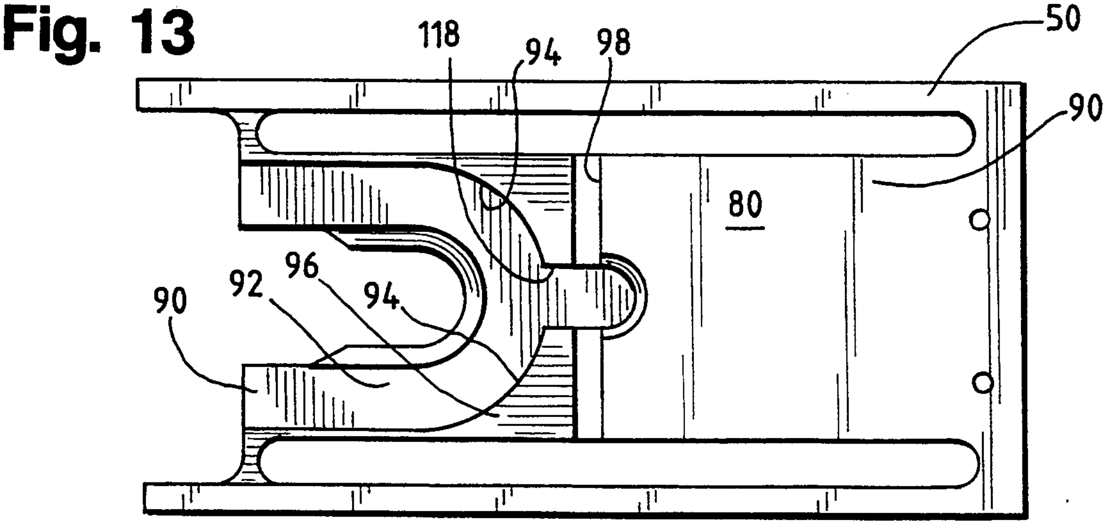
FIG. 13, on the scale of FIGS. 11 and 12, is a bottom plan view of the shuttle and related components of the machine.
Figure 14:
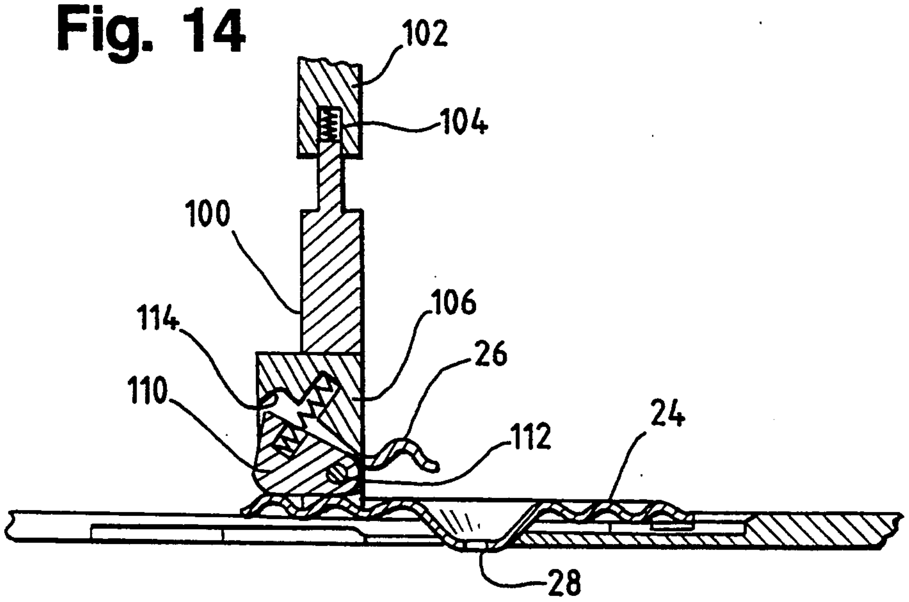
FIGS. 14 and 15, on the same scale, are longitudinal, sectional views taken through the adjustable stop and related components of the machine, as shown in FIG. 12, to show successive stages as one of the generally square washers is displaced via the shuttle, past a gate, which overlies the displaced washer.
Figure 15:
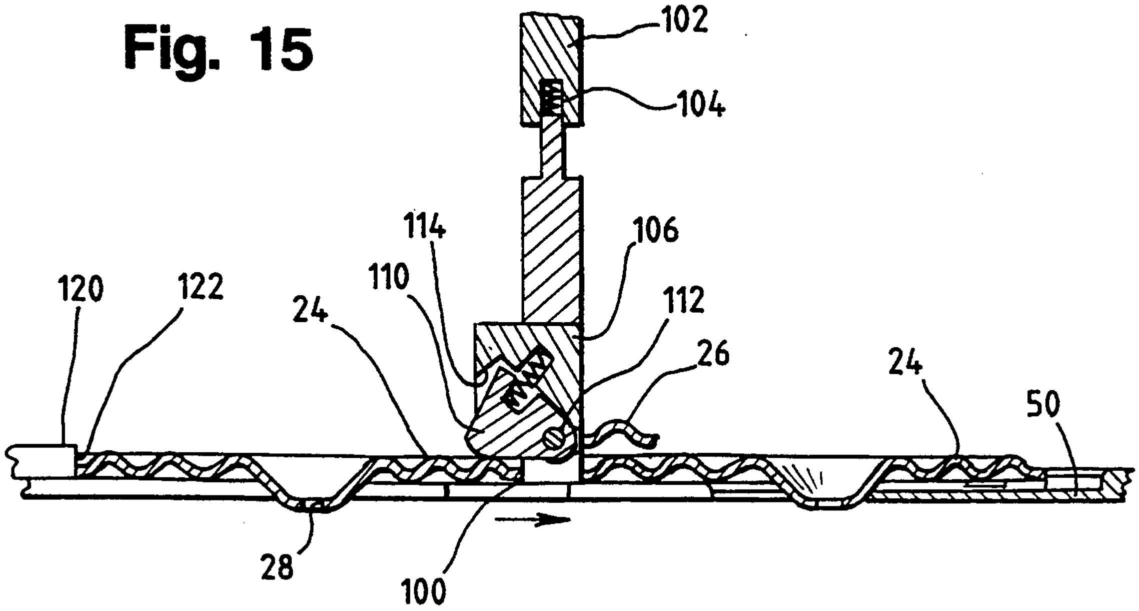
Figure 16:
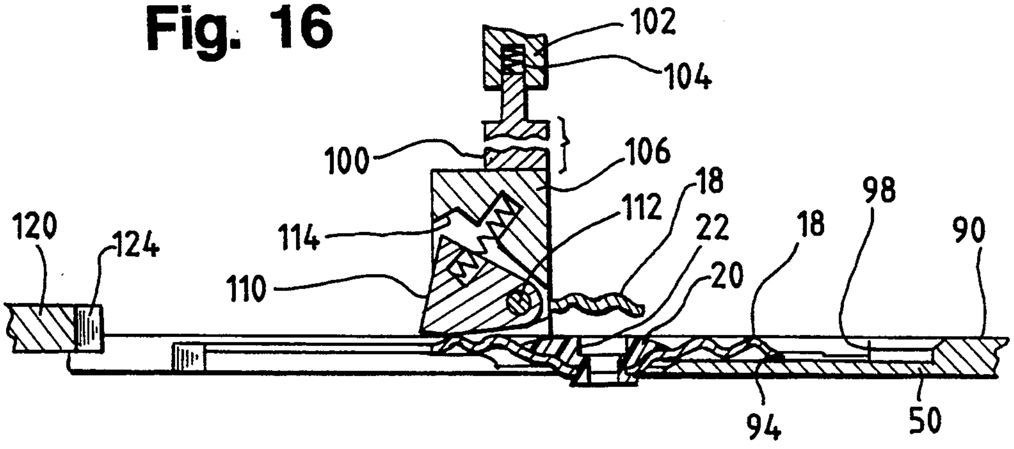
FIGS. 16, 17, and 18, on the same scale, are longitudinal, sectional views taken through the adjustable stop and related components of the machine, as shown in FIG. 12, to show successive stages as one of the generally circular washers is displaced via the shuttle, past the gate, which prevents the displaced washer from moving with the shuttle when the shuttle is retracted.

As shown in FIGS. 6, 7, and 13 through 18, a gate 100 is mounted to the base 30, beneath a back wall 102 of the chute 34, so as to be vertically movable toward and away from a lower position. The gate 100 is biased toward the lower position by a spring 104 acting between the gate 100 and the wall 102. As shown in FIG. 16, if the relatively small washers are used, the gate 100 in the lower position bears against the shuttle 50, provides sufficient clearance for the lowermost washer 18 being removed by the shuttle 50 from a stack of the relatively small washers 18 to pass beneath the gate 100, but provides insufficient clearance for any overlying washer 18 in the same stack to pass beneath the gate 100. As shown in FIG. 14, if the relatively large washers 24 are used, the gate 100 in the lower position bears against the shuttle 50, provides sufficient clearance for the lowermost washer 24 being removed by the shuttle 50 from a stack of the relatively large washers 24 to pass beneath the gate 100, but provides insufficient clearance for any overlying washer 24 to pass beneath the gate 100.

As a significant improvement contemplated by this invention, a pawl 110 is mounted pivotally to a block-like structure 106, which is mounted fixedly to the gate 100, via a pivot pin 112, within a back, lower cavity 114 of the structure 106. Thus, the pawl 110 is mounted so as to be pivotally movable through a range of positions including upper, inoperative positions and a lower, operative position.

Figure 17:
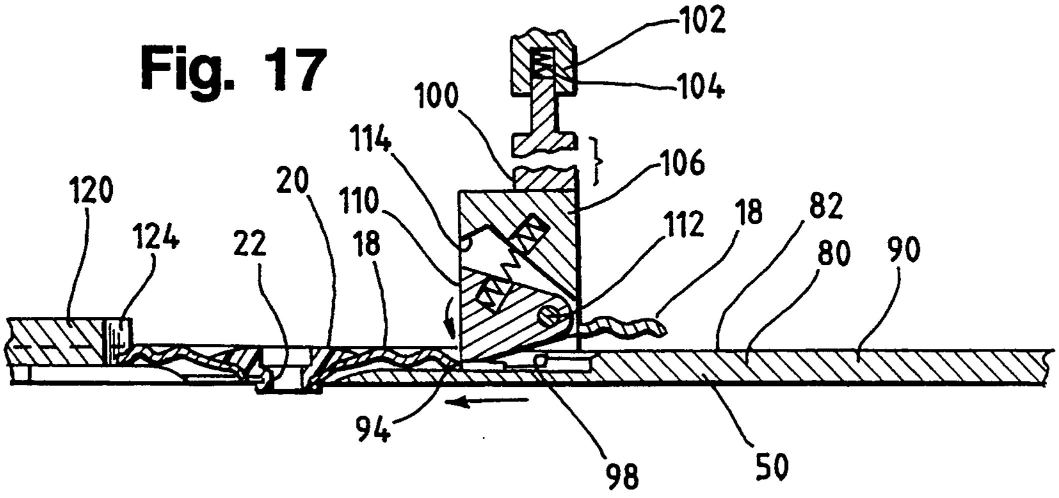
Figure 18:
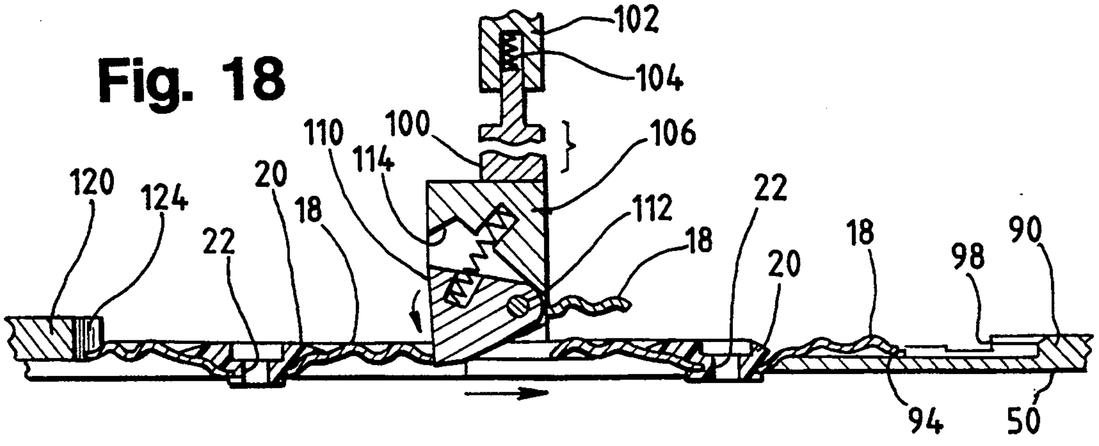

As shown in FIGS. 16, 17, and 18, if the relatively small washers 18 are used, the pawl 110 in any of the inoperative positions does not interfere with the lowermost washer 18 being removed by the shuttle 50 from a stack of the relatively small washers 18 and passing beneath the pawl 110. Further, the pawl 110 in the operative position is disposed to prevent a relatively small washer 18 in the washer-releasing position from moving forwardly with the shuttle 50 when the shuttle 50 next moves from the washer-releasing position toward the washer-engaging position, by engaging a front edge of the washer 18 in the washer-releasing position. Because of relative proportions of the shuttle 50, the gate 100, the pawl 110, and related elements of the machine 10, a relatively small washer 18 in the washer-releasing position has a sufficiently small size to permit the pawl 110 to pivot to the operative position when the shuttle 50 next moves from the washer-releasing position. As shown in FIG. 13, the shuttle 50 has a longitudinal recess 118 extending frontwardly from the recess 92. The recess 118 accommodates the pawl 110 in the lower, operative position.

As shown in FIGS. 14 and 15, if the relatively large washers 24 are used, the pawl 110 remains in the inoperative positions so as not to interfere with the lowermost washer 24 being removed by the shuttle 50 from a stack of the relatively large washers 24 and passing beneath the pawl 110. The gate 110 bears downwardly against the lowermost washer 24 from the stack while such washer 24 is passing beneath the pawl 110. Further, the gate 100 drops downwardly against the shuttle portion 90 and engages an edge of such washer 24 after such washer 24 has reached the washer-releasing position, so as to restrain such washer 24 against moving with the shuttle 50 when the shuttle 50 next moves to the washer-engaging position.

As shown in FIGS. 7 through 12, the machine 10 comprises an elongate stop 120, which is mounted to a cross bracket 130 of the base 30 so as to be selectively adjustable between a first position (see FIG. 8) wherein a flat end 122 of the stop 120 provides clearance for a generally square washer 24 being moved to the washer-releasing position and a second position (see FIG. 9) wherein an opposite, concave, generally V-shaped end 124 of the stop 120 is arranged to limit backward movement of a genially circular washer 18 to the washer-releasing position by engaging an edge of such washer 18. In the first position, the edge 126 of the cross bracket 130 limits backward movement of a generally square washer 24 being moved to the washer-releasing position. In the second position, the end 124 of the stop 120 centers such a washer 18 in the washer-releasing position.

The cross bracket 130 of the base 30 has a channel 132 extending longitudinally. The channel 132 has an upper wall 134 and two opposite sides 136. The channel 130 opens downwardly and is adapted to accommodate the stop 120 against the upper wall 134, between the opposite sides 136, when the stop 120 is adjusted to the first or second position noted above. A bolt 140 having a head 142 and a threaded end 144 extends upwardly through a hole 146 in the stop 120 and through a hole 148 in the cross bracket 130. The bolt 140 receives a coiled spring 150, a washer 152, and a threaded nut 154, which mounts the coiled spring 150 on the threaded end 144, above the cross bracket 130. The head 142, which is received in a recess 156 opening downwardly in the stop 120, retains the stop 120 on the bolt 140. The bolt 140 has a sufficient length to enable the stop 120 to be vertically movable with the bolt 140 between an elevated position wherein the stop 120 is accommodated by the channel 132 and a lowered position wherein the stop 120 is disposed below the channel 132. The stop 120 is biased to the elevated position by the coiled spring 150 acting between the threaded nut 152 and the cross bracket 130. As suggested by FIG. 8, the stop 120 is rotatable when moved to the lowered position. As shown in FIGS. 7, 9, and 10, the stop 120 is confined by the channel sides 136 so as to be non-rotatable on the post when moved to the elevated position, whether the stop 120 has been adjusted to the first or second position noted above.

As shown in FIG. 1, 8, 9, and 10, a measuring bar 160 of any desired length may be optionally mounted to the base 30 so as to extend longitudinally behind the base 30. The measuring bar 160 is shown separately in FIGS. 24 and 25. The measuring bar 160 facilitates spacing the washers 18 or the washers 24 at regular intervals.

The measuring bar 160 has a distal end, which is bent upwardly to define a hook 162, and a proximal end, which is bifurcated so as to define two parallel legs 164. The parallel legs 164 are adapted to fit within the channel sides 136, between the stop 120 and the base 30, so that the measuring bar extends longitudinally from the cross bracket 130. The parallel legs 164 are bent upwardly to define two hooks 166. As shown in FIGS. 8 and 9, the cross bracket 130 has a transverse recess, 168, which opens downwardly. The transverse recess 168 is adapted to accommodate the hooks 166.

As shown in FIGS. 1, 19, 20, and 21, the screw gun 60 has a conventional handle, which constitutes a primary handle 170 of the machine 10. The primary handle 170 extends in a generally perpendicular direction relative to the tubular element 64 mounting the screw gun 60. The screw gun 60 is mounted adjustably to the tubular element 64 via a clamping collar 172 fitted over the tubular element 64 and secured by screws 174. The clamping collar 172 has a lower, tubular portion 176, which has a circumferential groove 178. The clamping collar 172 has two curved arms 180, each fitting around the screw gun 60 and each having an external flange 182. One flange 182 has an unthreaded hole 184. The other flange 182 has a threaded hole 186. A bolt 190, which has a head 192 shaped to enable the bolt to be finger-tightened and finger-loosened, is extended through the unthreaded hole 184 of one flange 182 and is threaded into the threaded hole 186 of the other flange 182. Thus, the clamping collar 172 enables the screw gun 60 to be rotatably adjusted on the tubular element 64, whereby the primary handle 170 can be adjustably positioned.

As shown in the same views, a secondary handle 200 is mounted adjustably to the tubular element 64, via the clamping collar 172 and via a handle clamp 202, at a level approximating the level of the primary handle 170. The handle clamp 202 has two curved arms 204, which have their distal ends 206 spaced from each other by a distance $D_1$ slightly greater than the diameter of the tubular portion 176 of the clamping collar 172 so as to enable the curved arms 204 to embrace the tubular portion 176 beneath the flanges 182 of the clamping collar 172. The arms 204 are curved so as to conform generally to an imaginary cylinder having a diameter $D_2$ approximating the diameter of the clamping collar 172, below the curved arms 180, except that the respective diameters provide sufficient clearance to enable the curved arms 204 to embrace the tubular portion 176 of the clamping collar 172 and to be rotatably adjusted when fitted thereover. The handle clamp 202 has a threaded hole 208, which leads to the circumferential groove 178 when the curved arms 204 are elevated along the tubular element 64 so as to engage the flanges 182 and to embrace the collar portion 176. A bolt 210, which has a head 212 shaped to enable the bolt to be finger-tightened and finger-loosened, is threaded through the threaded hole 208, into the circumferential groove 178, against the clamping collar 172. The handle clamp 202 also has an integral, generally upright arm 214, to which the secondary handle 200 is mounted.

Thus, the screw gun 60 providing the primary handle 170 and the handle clamp 202 mounting the secondary handle 200 can be independently adjusted so as to define an angle within a range from an acute angle to a straight angle, as a response to conditions of machine use or preferences of a user. The acute angle may be as small as physical dimensions of the screw gun 60, the secondary handle 200, and the handle clamp 202 allow. As shown in FIGS. 22 and 23, the rollers 32 on each side of the machine 10 include an inner roller 220 and an outer roller 222, which is removable from the inner roller 220 to permit the machine 10 to be positioned near a vertical wall 224. A locking pin 226 of a known type is used to mount the outer roller 222 removably to the inner roller 220. The locking pin 226 extends inwardly through a hub 228 of the outer roller 222, into a hub 230 of the inner roller 220, and has spring-loaded pins 232, which extend radially from an inner end 234 of the locking pin 226 where such pins 232 can snap into radial sockets (not shown) in the hub 230 of the inner roller 220. At an outer end 236, the locking pin 226 has a wire loop 238 to facilitate pulling the locking pin 226 from the hubs 228, 230.

Figure 26:
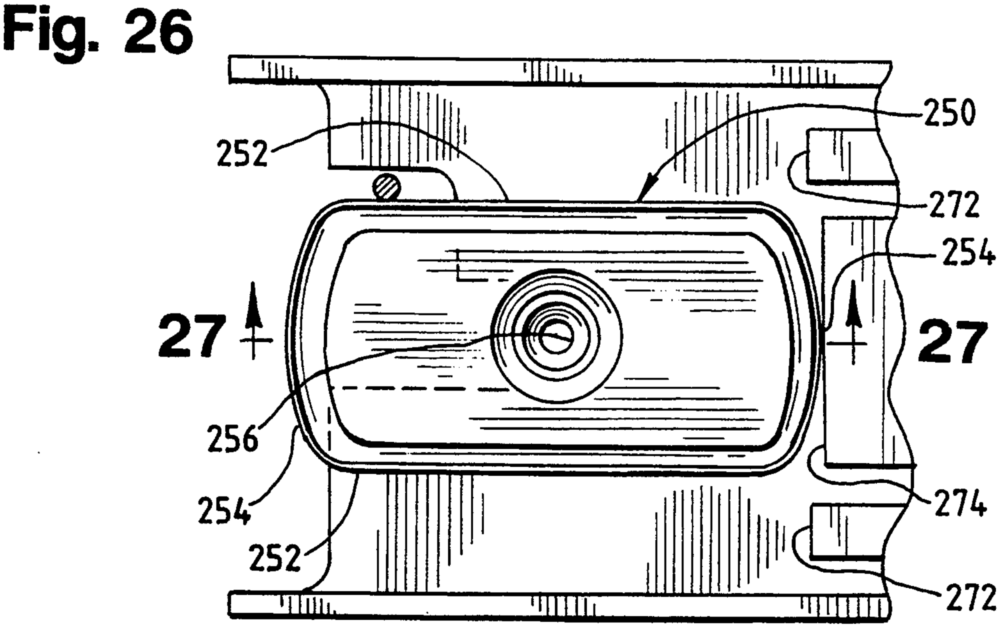
FIG. 26 is a fragmentary, top plan view of a modified shuttle being used to displace a generally oblong washer of a type used in Europe.
Figure 27:
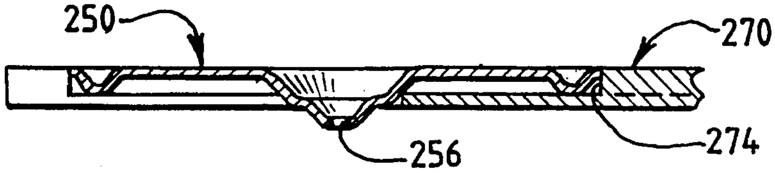
FIG. 27 is a sectional view taken along line 27—27 of FIG. 26 in a direction indicated by arrows.
Figure 28:
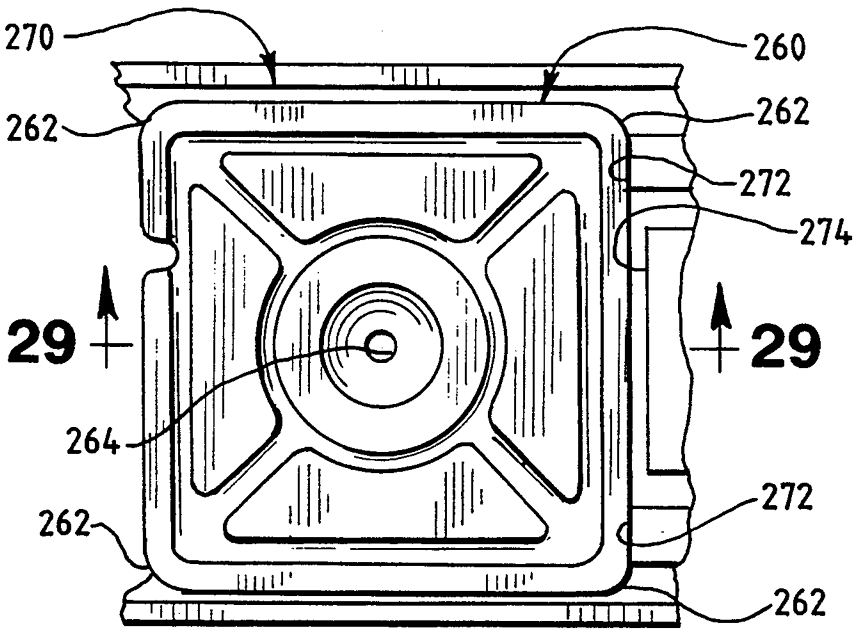
FIG. 28 is a view similar to FIG. 26 but showing the modified shuttle being used to displace a generally square washer of a type used in Europe.
Figure 29:
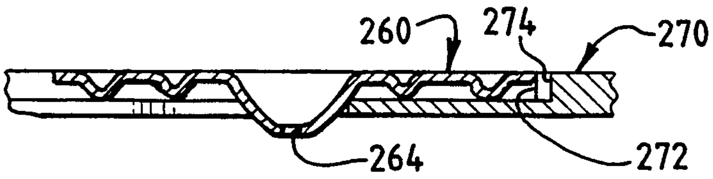
FIG. 29 is a sectional view taken along line 29—29 of FIG. 28 in a direction indicated by arrows.
Figure 30:
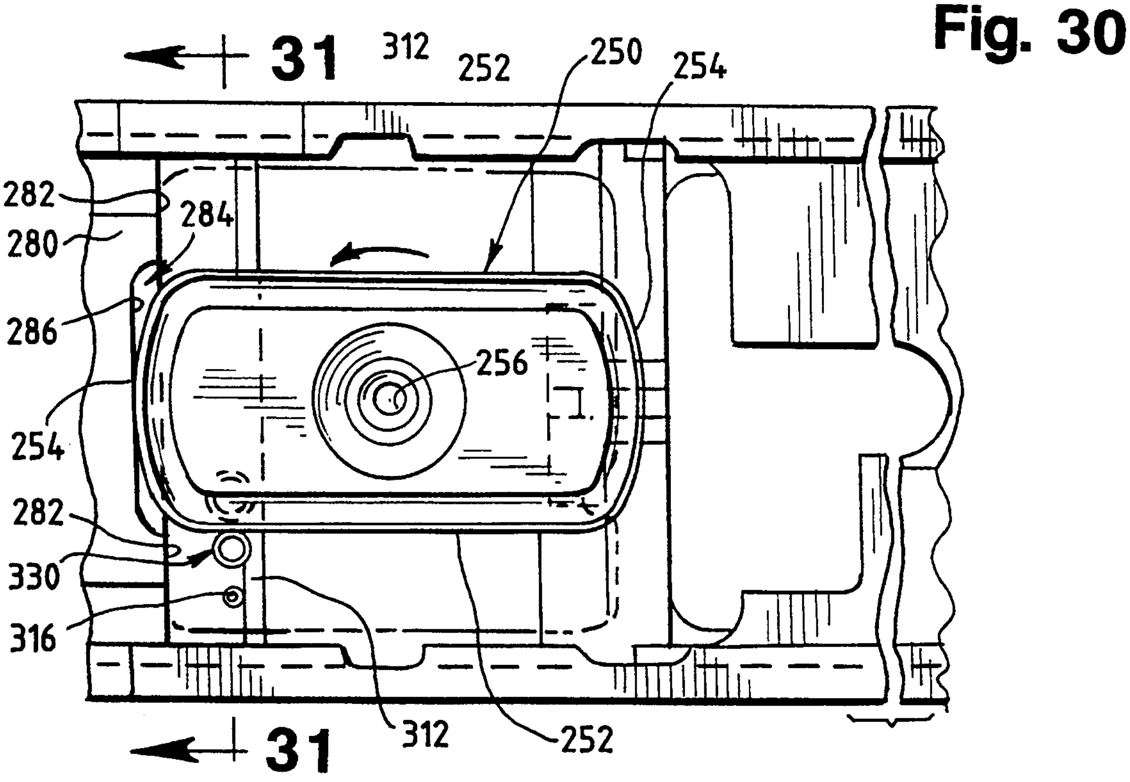
FIG. 30 is a fragmentary plan view of a cross bracket and related components of the machine, as used with a generally oblong washer, as shown in FIGS. 26 and 27. A generally square washer, as shown in FIGS. 28 and 29, is shown in broken lines.

As shown in FIGS. 26 through 31, the machine 10 is adaptable for stackable roofing washers of either of two types, which are used commonly in Europe. As shown in FIGS. 26 and 27 and in solid lines in FIG. 30, each roofing washer may be a generally oblong, stamped steel washer 250 having two relatively long, straight sides 252, two relatively short, curved ends 254, and a central aperture 256. As shown in FIGS. 28 and 29 and in broken lines in FIG. 31, each roofing washer may be a generally square, stamped steel washer 260 having rounded corners 262 and a central aperture 264. Each generally square washer 260 is similar to each generally square washer 24, as illustrated and described, except that the respective generally square washers have different patterns of reinforcing ribs.

As adapted for the washers 250, 260, the machine 10 includes a shuttle 270, which is substituted for the shuttle 50. The shuttle 270 is similar to the shuttle 50, as illustrated and described, except that the shuttle 270 has a centrally located edge 274 positioned for positive engagement with one end 254 of a washer 250 being displaced from a stack of such washers 250 to the separated position and two laterally spaced, aligned edges 272 positioned for positive engagement with a washer 260 being displaced from a stack of such washers 260 to the separated position, and except that the shuttle 270 has differently shaped recesses, which accommodate whichever of the washers 250, 260, is being displaced. The edge 274 is offset forwardly from the aligned edges 272, as shown, so as to accommodate dimensional differences between the washers 250, 260.

As adapted for the washers 250, 260, the machine 10 includes a cross bracket 280 (see FIG. 30) which is substituted for the cross bracket 130 and which is mounted to the base 30 of the machine 10. The cross bracket 280 is configured so as to have two aligned edges 282, which are analogous to the edge 126 of the cross bracket 130, to limit backward movement of a generally square washer 260 to the separated position. The cross bracket is configured also to have a recess 284 between the aligned edges 282. The recess 284 defines a backwardly offset edge 286 to limit backward movement of a generally oblong washer 250 to the separated position.

Figure 31:
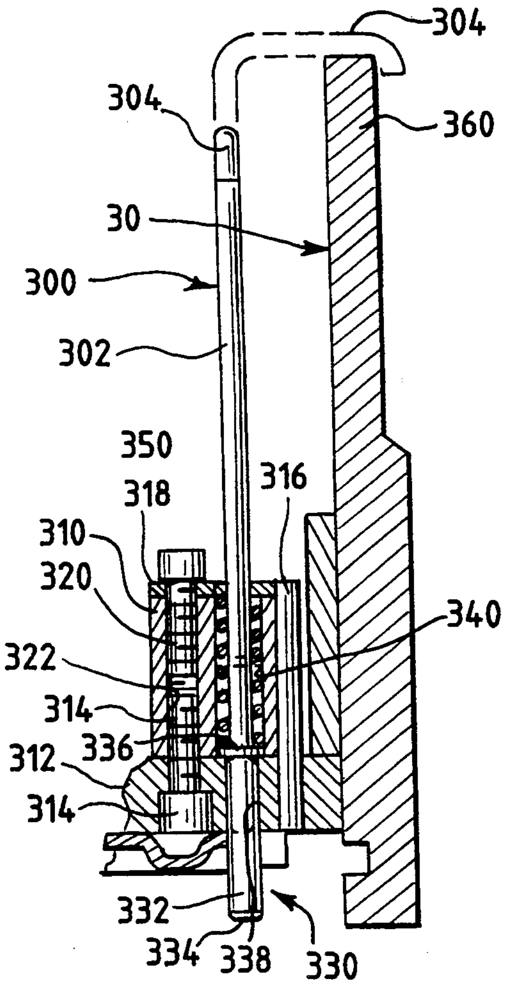
FIG. 31 is a sectional view taken along line 31—31 of FIG. 30 in a direction indicated by arrows.

As a significant improvement contemplated by this invention, a rod 300 is provided, which has a lower, straight portion 302 and an upper, hooked portion 304. As shown in FIG. 31, a mounting block 310 is mounted to an upwardly and forwardly offset portion 312 of the cross bracket 280, via a threaded fastener 314 and a roll pin 316. As shown in FIG. 31, a covering plate 318 is mounted on the mounting block 312, via a threaded fastener 320 and the roll pin 316. The threaded fasteners 314, 320, are threaded into a common, threaded aperture 322 of the mounting block 312.

The lower portion 302 of the rod 300 mounts an eyelet 330, which has a lower sleeve portion 332 fitting over the lower portion 302 with a frictional fit, a lower, closed end 334, and an upper, annular flange 336. The sleeve portion extends through a bore 336 of the bracket portion 312 so that the sleeve portion 338 can move upwardly and downwardly in the bore 338. The annular flange 336 is disposed in a bore 340 of the mounting block 310 so as to be upwardly and downwardly movable in the bore 340. Above the eyelet 330, the straight portion 302 of the rod 300 extends through a bore 342 of the covering plate 318.

A coiled spring 350 is disposed around the straight portion 302, between the covering plate 318 and the annular flange 336, so as to bias the rod 300 downwardly to an operative position. The coiled spring 350 permits the rod 300 to be upwardly moved to an inoperative position, in which the rod 300 is manipulatable to hook the hooked portion 304 of the rod 300 releasably over an adjacent wall 360 of the base 30, as suggested in broken lines in FIG. 31.

Thus, when it is desired to move the rod 300 from the operative position into the inoperative position, the rod 300 is lifted via the hooked portion 304, rotated about one quarter-turn to dispose the hooked portion 304 over the adjacent wall 360, and released to permit the coiled spring 350 to pull the rod 300 downwardly until the hooked portion 304 engages such wall 360. Also, when it is desired to move the rod 300 from the inoperative position into the operative position, these steps are reversed.

In the inoperative position, as shown in broken lines in FIG. 31, the rod 300 and the eyelet 330 are raised so as to provide clearance for a generally square washer 260 to pass beneath the eyelet 300. In the operative position, as shown in solid lines in FIG. 31 and also in FIG. 26, the rod 300 and the eyelet 330 are lowered so as to provide clearance for a generally oblong washer 250 to pass near the eyelet 330. Further, in the operative position, the eyelet 330 is positioned to engage one side 252 of a generally oblong washer 250 in the separated position so as to prevent such washer 250 from rotating in a direction indicated by a curved arrow in FIG. 30 when a fastener (not shown in FIGS. 22 through 27) is driven through the central aperture 256 of such washer 250.

Various modifications may be made in the preferred embodiment described above without departing from the scope and spirit of this invention.

I claim:

1. In a washer-dispensing and fastener-driving machine for dispensing stackable roofing washers individually from a stack of similar washers and for driving fasteners through the washers for fastening at least one layer of roofing material to an underlayment, each washer having two straight sides and two opposite ends, the combination comprising:

(a) a base;

(b) means including a shuttle mounted movably to the base for displacing a lowermost washer from the stack and for moving the lowermost washer lengthwise to a separated position;

(c) means including a screw gun for driving a fastener rotatably and downwardly through the displaced washer in the separated position; and (d) means including an element adjustable between an inoperative position relative to the displaced washer and an operative position relative thereto and engageable with the displaced washer when adjusted to the operative position for preventing the displaced washer from rotating when a fastener is being driven through the displaced washer, said element providing clearance for such a washer being displaced by the shuttle when adjusted to the inoperative position.

2. The combination of claim 1 wherein the machine is adaptable for dispensing stackable roofing washers of either of two types, namely generally square washers and generally oblong washers, each generally oblong washers having two relatively long sides and two relatively short ends.

3. The combination of claim 2 wherein the element engageable with the displaced washer is adjustable upwardly to the inoperative position, in which said element is not engageable with a washer of either type in the separated position, and downwardly to the operative position, in which said element is engageable with one of the relatively long sides of such a generally oblong washer in the separated position.

4. The combination of claim 1 wherein the element engageable with the displaced washer includes a rod having a straight portion extending in a generally vertical direction, the straight portion being mounted to the base so as to be upwardly and downwardly movable.

5. The combination of claim 4 wherein the straight portion of the rod is biased downwardly toward the operative position.

6. In a washer-dispensing and fastener-driving machine for dispensing stackable roofing washers individually from a stack of similar washers and for driving fasteners through the washers for fastening at least one layer of roofing material to an underlayment, the combination comprising:

(a) a base;

(b) means including a shuttle mounted movably to the base for displacing a lowermost washer from the stack and for moving the lowermost washer lengthwise to a separated position;

(c) means including a screw gun for driving a fastener rotatably and downwardly through the displaced washer in the separated position; and (d) means including an element engageable with the displaced washer for preventing the displaced washer from rotating when a fastener is being driven through the displaced washer;

wherein the machine is adaptable for dispensing stackable roofing washers of either of two types, namely generally square washers and generally oblong washers, each generally oblong washer having two relatively long sides and two relatively short ends; wherein the element engageable with the displaced washer is adjustable upwardly to an inoperative position, in which said element is not engageable with a washer of either type in the separated position, and downwardly to an operative position, in which said element is engageable with one of the relatively long sides of such a generally oblong washer in the separated position; wherein the element engageable with the displaced washer includes a rod having a lower, straight portion extending in a generally vertical direction and an upper, hooked portion, the lower portion being mounted to the base so as to be upwardly and downwardly movable and being biased downwardly to the operative position, the upper portion being manipulatable in the operative position to hook over a portion of the base.

* * * * *